United States Patent
Folger et al.

(10) Patent No.: US 7,686,313 B2
(45) Date of Patent: Mar. 30, 2010

(54) WHEEL END VENTED THROUGH SENSOR CABLE

(75) Inventors: Russell F. Folger, Canton, OH (US); Michael A. Gromosiak, North Canton, OH (US); Gregory C. Piotrowski, North Canton, OH (US)

(73) Assignee: The Timken Company, Canton, OH (US)

( * ) Notice: Subject to any disclaimer, the term of this patent is extended or adjusted under 35 U.S.C. 154(b) by 461 days.

(21) Appl. No.: 11/740,635

(22) Filed: Apr. 26, 2007

(65) Prior Publication Data

US 2007/0257664 A1 Nov. 8, 2007

Related U.S. Application Data

(60) Provisional application No. 60/795,066, filed on Apr. 26, 2006.

(51) Int. Cl.
*B62D 7/18* (2006.01)
*B60B 27/00* (2006.01)
*F16C 32/00* (2006.01)

(52) U.S. Cl. ............... 280/93.512; 280/14; 301/105.1; 301/131; 384/448

(58) Field of Classification Search ............ 280/93.512, 280/14, 855; 301/5.309, 105.1, 131, 132; 384/448
See application file for complete search history.

(56) References Cited

U.S. PATENT DOCUMENTS

| | | | | |
|---|---|---|---|---|
| 5,852,361 | A * | 12/1998 | Ouchi et al. | 324/174 |
| 5,997,182 | A * | 12/1999 | Brown | 384/448 |
| 6,640,438 | B2 * | 11/2003 | Webb et al. | 29/894.362 |
| 6,658,943 | B2 * | 12/2003 | McDearmon | 73/795 |
| 6,688,773 | B2 * | 2/2004 | Webb et al. | 384/537 |
| 6,774,622 | B2 * | 8/2004 | Faetanini et al. | 324/174 |
| 6,870,363 | B2 * | 3/2005 | Krabill et al. | 324/166 |
| 7,108,427 | B2 * | 9/2006 | Joki et al. | 384/448 |
| 7,302,979 | B2 * | 12/2007 | Davison et al. | 152/417 |
| 7,314,257 | B2 * | 1/2008 | Svendenius et al. | 303/167 |
| 7,501,811 | B2 * | 3/2009 | Ono | 324/207.25 |
| 2001/0026095 | A1 * | 10/2001 | Di Ponio et al. | 301/105.1 |
| 2002/0172439 | A1 * | 11/2002 | Webb et al. | 384/448 |

* cited by examiner

*Primary Examiner*—Toan C To
(74) *Attorney, Agent, or Firm*—Polster, Lieder, Woodruff & Lucchesi L.C.

(57) ABSTRACT

A speed sensor for a wheel end that has an interior that is substantially isolated from an atmosphere around the wheel end. The speed sensor is carried by a housing of the wheel end for monitoring the rotation of the wheel end and indicating the angular velocity of the wheel end. The speed sensor includes a cable leading from the sensor to a location remote from the wheel end and further includes leads that transmit a signal and a sheath that encloses the leads. The sheath is open enough to allow a fluid to flow through its interior. A vent channel provides communication between the interior of the wheel end and the interior of the sheath on the cable.

9 Claims, 3 Drawing Sheets

WHEEL END VENTED THROUGH SENSOR CABLE

The present application claims priority to U.S. Provisional Patent Application Ser. No. 60/795,066, filed Apr. 26, 2006, the content of which is incorporated herein by reference.

BACKGROUND OF THE INVENTION

This invention relates in general to wheel ends, and more particularly to a wheel end provided with a sensor and cable that together serve as a vent for a bearing in the wheel end.

More and more components of automotive vehicles are being furnished by outside suppliers as packaged assemblies. Typical are wheel ends used to couple the road wheels of the vehicles to suspension uprights that form part of the suspension systems for such vehicles. The typical wheel end has a housing that is bolted to a suspension upright, a hub provided with a spindle that projects into the housing, and an antifriction bearing located between the housing and spindle to enable the hub to rotate with respect to the housing. The road wheel is secured to a flange at the end of the spindle on the hub. The assembly procedure is such that upon completion the bearing has the correct setting—normally slight preload—and a measured quantity of grease for lubrication. A seal pressed into the outboard end of the housing and another seal or end cap pressed into the inboard end of the housing retains the lubricant in the bearing and excludes contaminants. Conditions may exist, such as a change in temperature or elevation, that cause the pressure within the bearing to increase. Indeed, if an end cap is pressed into the housing, it will function as a pump during assembly and increase the pressure within the bearing. Moreover, oils used in the manufacture of the bearing and in the assembly of the wheel end leach some of the oil out of the grease. The elevated pressure produced within the bearing may drive some of the free oil past the lips of the seals and out of the bearing.

Many wheel ends have speed sensors to monitor the angular velocity of their hubs. Active sensors are preferred. This type of sensor has a barrel that projects into the interior of the housing from a head, and both the head and barrel have electronic components embedded in them. The electronic components are totally isolated from contaminants, such as moisture, to which the wheel end may be subjected. As a consequence, the sensor has no through passage through which the interior of the bearing may be vented.

SUMMARY OF THE INVENTION

A speed sensor for a wheel end that has an interior that is substantially isolated from an atmosphere around the wheel end. The speed sensor is carried by a housing of the wheel end for monitoring the rotation of the wheel end and indicating the angular velocity of the wheel end. The speed sensor includes a cable leading from the sensor to a location remote from the wheel end and further includes leads that transmit a signal and a sheath that encloses the leads. The sheath is open enough to allow a fluid to flow through its interior. A vent channel provides communication between the interior of the wheel end and the interior of the sheath on the cable.

DESCRIPTION OF THE INVENTION

Figure 1:
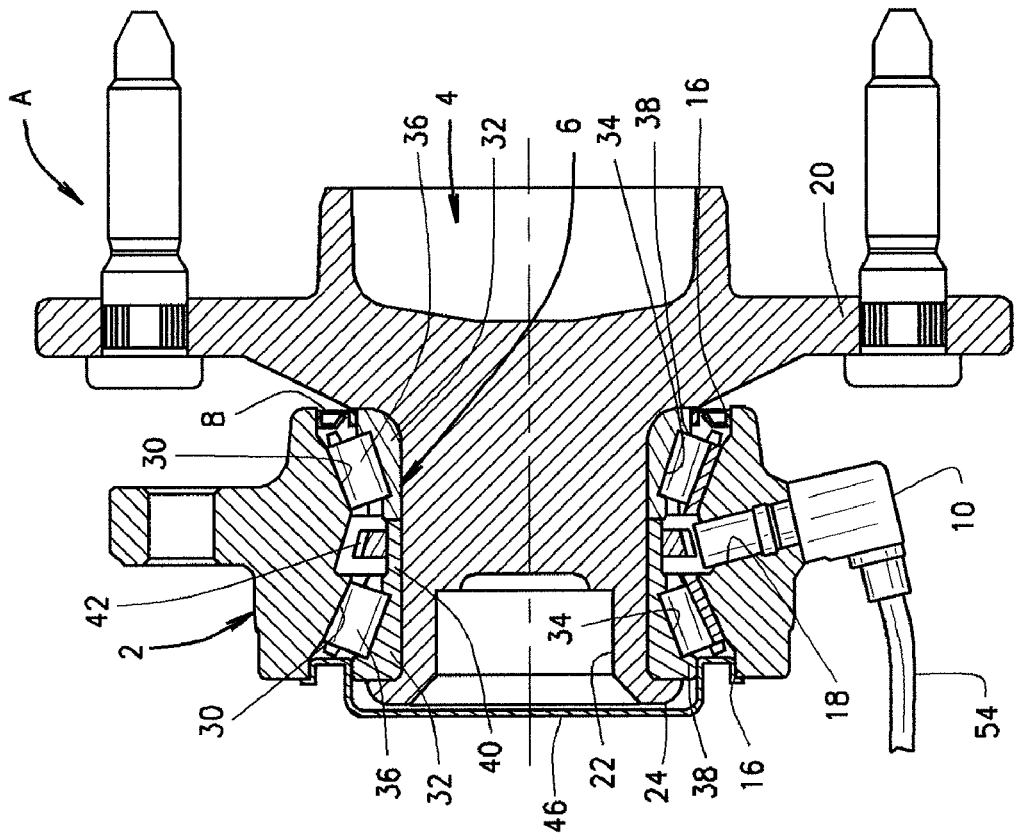
FIG. 1 is a side section view of a wheel end according to an embodiment of the present invention.
Figure 2:
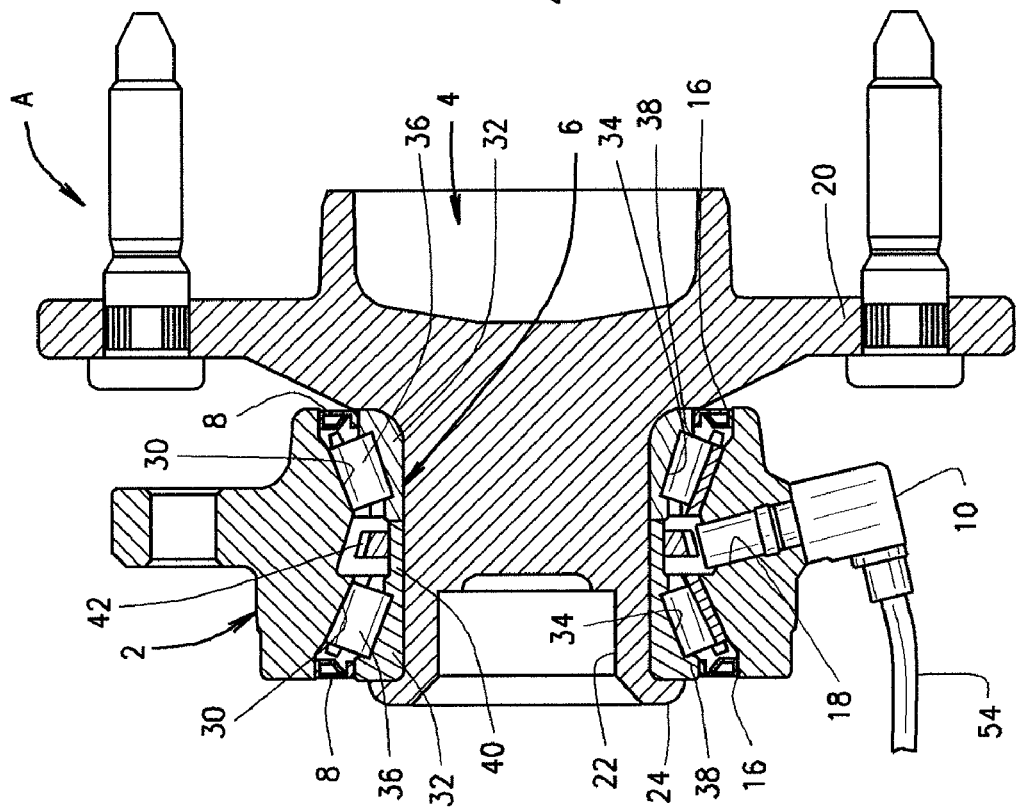
FIG. 2 is a side section view of a wheel end according to another embodiment of the present invention.

Referring now to FIGS. 1 and 2, a wheel end A couples a road wheel to a suspension upright for an automotive vehicle, enabling the wheel to rotate about an axis X. The wheel end A includes a housing 2 that is bolted to the suspension upright, and a rotatable hub 4 to which the road wheel is secured, an antifriction bearing 6 between the housing 2 and the hub 4 to accommodate the rotation, seals 8 at the ends of the bearing 6, and a speed sensor 10 fitted to the housing 2.

The housing 2 encloses the bearing 6 and at its ends has end bores 16 that receive the seals 8. Both are pressed into their respective end bores 16. The housing 2 also has an oblique bore 18 that receives the speed sensor 10.

The hub 4 has a drive flange 20 located beyond the outboard end of the housing 2 and a spindle 22 that projects from the flange 20 into the housing 2. The spindle 22 is for the most part solid, and its end is turned outwardly in a roll forming procedure to provide a formed end 24 that captures the bearing 6 on the spindle 22.

The bearing 6 includes two outer raceways 30 that are machined into the housing 2 and two inner races in the form of cones 32 that are fitted over the spindle 22 of the hub 4, with each having an inner raceway 34 and a thrust rib 38 at the large end of its raceway 34. In addition, the bearing 6 has rolling elements in the form of tapered rollers 36 that are located in two rows between the inner and outer raceways 30 and 34.

The rollers 36 along their tapered side faces contact the raceways 30 and 34—there being line contact—and at their large end faces bear against the thrust ribs 38 of the cones. The rollers 36 are on apex, so pure rolling contact exists between the rollers 36 and the raceways 30 and 34. One of the cones 32 has an extension 40 that abuts the other cone 32, and the length of the extension controls the setting of the bearing 6. It should be slight preload.

The extension 40 of the one cone 32 carries a tone wheel 42 that is monitored by the speed sensor 10. Being pressed over the spindle 22 of the hub 4, the cones 32 rotate with the hub 4 at the same angular velocity as the hub 4, and the same holds true for the tone wheel 42, which is pressed over the extension 40 on the one cone 32.

The seals 8 fit into the end bores 16 (FIG. 1) with press fits and surround the thrust ribs 38 of the two cones 32. Here they establish dynamic fluid barriers which isolate the interior of the housing 2 and bearing 6 that is in it. On the other hand, the inboard seal 8 may be replaced by an end cap 46 (FIG. 2) that is pressed into the inboard end bore 16. For the end cap 46 to be effective, the spindle 22 should not be hollow.

The sensor 10 includes a barrel 50 that fits into the oblique bore 18 of the housing 2 and projects toward the tone wheel 46 that revolves with the bearing cones 32 and the hub 4. Indeed, its end lies close to the rotating tone wheel 42. The sensor 10 also includes a head 52 that lies outside the housing 2, yet is joined to the barrel 50 so that the barrel 50 and head 52 are an integral unit. The sensor 10 contains electronic components that are completely encased and embedded in the barrel 50 and head 52, and they enable the sensor 10 to monitor rotation of the tone wheel 42 and produce an electrical signal that reflects the angular velocity of the tone wheel 42.

That signal is delivered to a cable 54 that is connected to the head 52 through a boot 56 and leads to a processor at a location remote from the wheel end A—a location generally free of moisture and other contaminants that might damage electronic components such as those in the sensor 10. The cable 54 contains leads that actually transmit the signals and a sheath that surrounds the leads. Enough space exists between the wall of the sheath and the enclosed leads to enable a fluid to flow through the cable 54.

Figure 3:
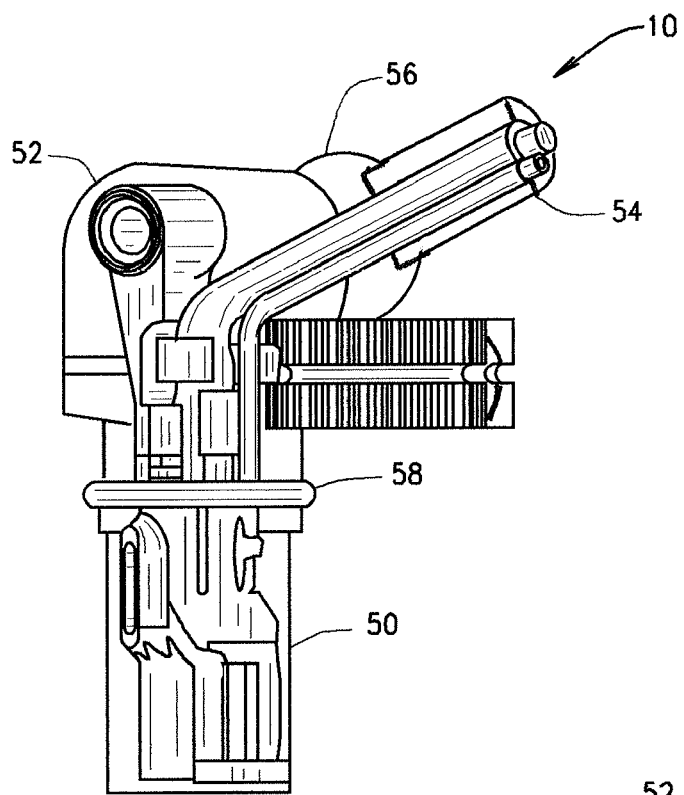
FIG. 3 is a perspective section view of speed sensor according to an embodiment of the present invention.
Figure 4:
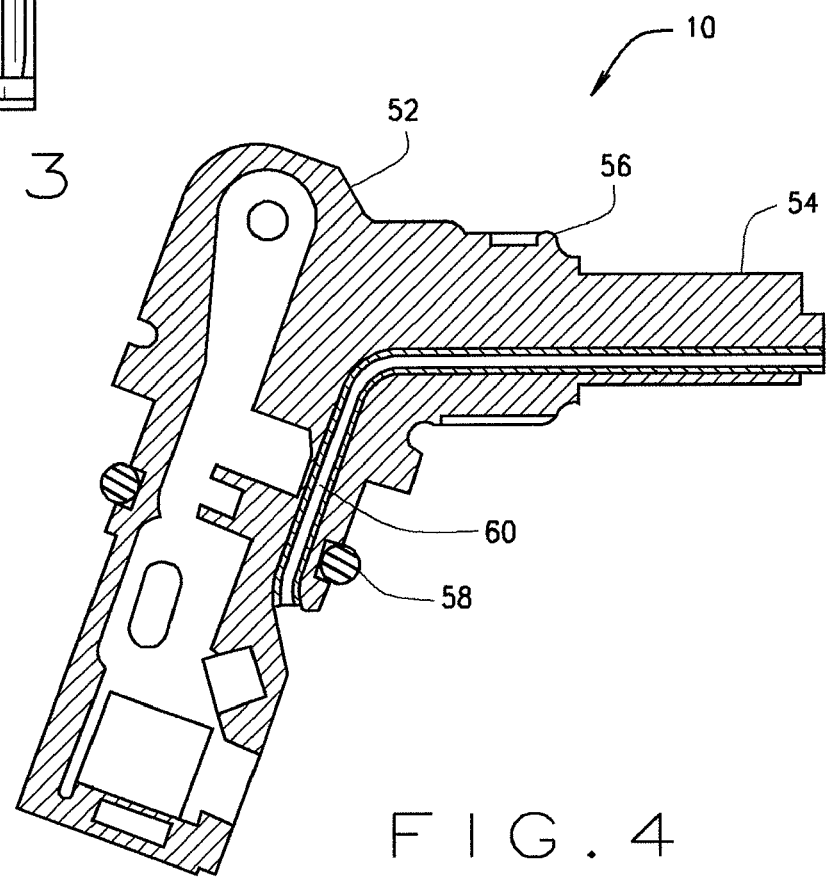
FIG. 4 is a side section view of a speed sensor according to an embodiment of the present invention.

Referring to FIGS. 3-4, the barrel 50 of the sensor 10 fits snugly into the oblique bore 18 of the housing 2, and an O-ring seal 58 located between the barrel 50 and the wall of the bore 18 excludes contaminants, including moisture. The sensor 10 contains a vent channel 60 that at one end opens out of the barrel 50 inwardly from the O-ring seal 58, so that here the channel 60 communicates with the interior of the housing 2 where the bearing 6 is located. The other end of the vent channel 60 opens into the boot 56 which is in turn is in communication with the interior of the sheath for the cable 54. The opposite end of the sheath is vented to the atmosphere at the location that is generally free of contaminants. Thus, the interior of the housing 2, where the bearing 6 is located, is vented to the atmosphere through the sensor 10 and through the cable 54.

Figure 5:
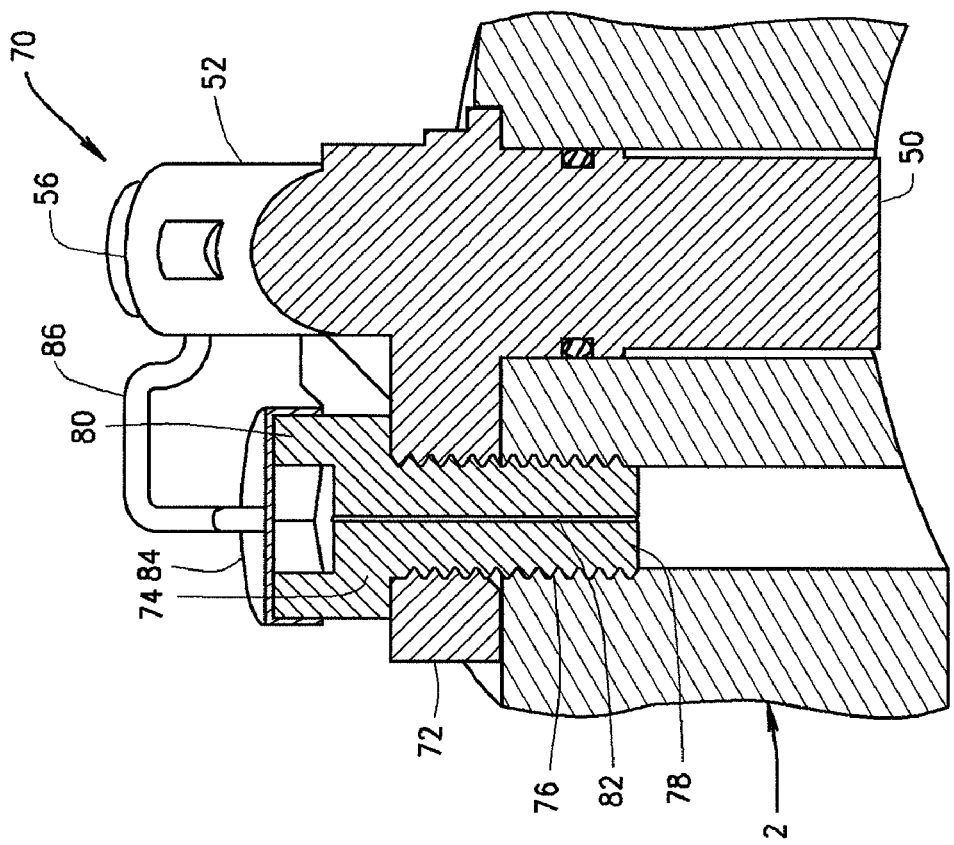
FIG. 5 is a side section view of a speed sensor according to another embodiment of the present invention.
Figure 6:
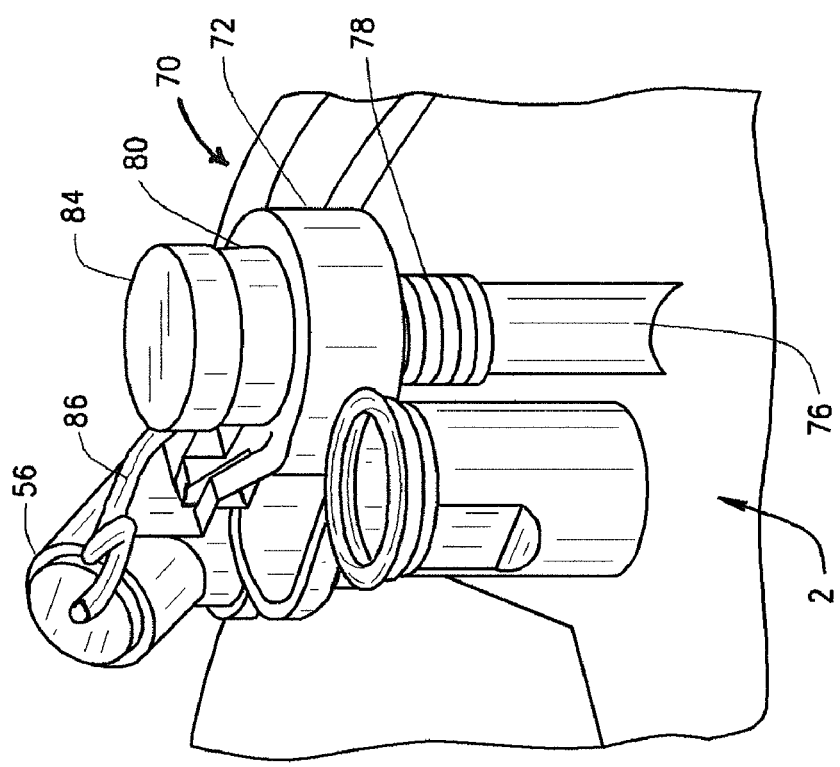
FIG. 6 is a side section view of a speed sensor according to another embodiment of the present invention.

As shown in FIGS. 5-6, a modified sensor 70 is similar to the sensor 10, but lacks the vent channel 60 in its barrel 50 and head 52. It does have a flange 72 that lies over the exterior surface of the housing 2 and it contains a hole 74 that aligns with a partially threaded bore 76 in the housing 2. The bore 76 lies parallel to the oblique bore 18 and like the oblique bore 18 passes from the exterior surface to the interior surface of the housing 2 and thus communicate with the interior of the housing 2 and the bearing 6. The threads of the threaded bore 76 extend inwardly from the exterior surface that the flange 72 overlies.

The hole 74 in the flange 72 of the modified sensor 70 receives a cap screw 78, which threads into the bore 76 in the housing 2 and secures the sensor 70 firmly to the housing 2. The cap screw 78 in turn has a head 80 that overlies the flange 72 of the sensor 70 and also a small diameter hole 82 that extends axially through the screw 78 from one end to the other.

Apart from that, the sensor 70 has a cap 84 that fits over the head 80 of the screw 78, effecting a seal with the head 80, and a connecting tube 86 that leads from the cap 84 to the boot 56 at which the cable 54 enters the sensor 70. At one end the tube 86 communicates with the interior of the cap 84 and the small diameter bore 82 in the screw 78. At its other end, the tube 86 communicates with the interior of the boot 56 and the interior of the sheath on the cable 54. Thus, the interior of the housing 2 and the bearing 6 within it communicates with the interior of the sheath on the cable 54 through the vent channel formed by the bore 82 in the screw 78, the interior of the cap 84 that is over the head 80 of the screw 78, and the tube 86 that connects the cap 84 with the boot 56 of the cable 54.

The invention claimed is:

1. A wheel end comprising:
    a housing;
    a hub having a spindle that projects into the housing;
    an antifriction bearing located between the housing and hub spindle to enable the hub to rotate relative to the housing;
    means closing the ends of the housing to isolate the interior of the housing and the bearings located within it;
    a speed sensor carried by the housing for monitoring the rotation of the hub and being capable of producing a signal that reflects the angular velocity of the hub;
    a cable leading from the sensor to a location remote from the wheel end and including leads that transmit the signal and a sheath that encloses the leads, the sheath being open enough to allow a fluid to flow through its interior; and
    a vent channel providing communication between the interior of the housing and the interior of the sheath on the cable.

2. A wheel end according to claim 1 wherein the vent channel is in the sensor.

3. A wheel end according to claim 1 wherein the sensor is secured to the housing with a screw and the vent channel extends through the screw.

4. A speed sensor for a wheel end, an interior of the wheel end being substantially isolated from an atmosphere around the wheel end, wherein the speed sensor is carried by a housing of the wheel end for monitoring the rotation of the wheel end and being capable of producing a signal that indicates the angular velocity of the wheel end, the speed sensor comprising:
    a cable leading from the sensor to a location remote from the wheel end and including leads that transmit the signal and a sheath that encloses the leads, the sheath being open enough to allow a fluid to flow through its interior; and
    a vent channel providing communication between the interior of the wheel end and the interior of the sheath on the cable.

5. A speed sensor according to claim 4 wherein the vent channel is in the sensor.

6. A speed sensor according to claim 4 wherein the sensor is secured to the wheel end with a screw and the vent channel extends through the screw.

7. A wheel end comprising:
    a housing;
    a hub having a spindle that projects into the housing;
    an antifriction bearing located between the housing and hub spindle to enable the hub to rotate relative to the housing;
    wheel end closing apparatus that isolates the interior of the housing and the bearings located within it;
    a speed sensor carried by the housing for monitoring the rotation of the hub and being capable of producing a signal that reflects the angular velocity of the hub;
    a cable leading from the sensor to a location remote from the wheel end and including leads that transmit the signal and a sheath that encloses the leads, the sheath being open enough to allow a fluid to flow through its interior; and
    a vent channel providing communication between the interior of the housing and the interior of the sheath on the cable.

8. A wheel end according to claim 7 wherein the vent channel is in the sensor.

9. A wheel end according to claim 7 wherein the sensor is secured to the housing with a screw and the vent channel extends through the screw.

* * * * *